US006790297B1

(12) United States Patent
Ueda et al.

(10) Patent No.: US 6,790,297 B1
(45) Date of Patent: Sep. 14, 2004

(54) RETAINER

(75) Inventors: Kouji Ueda, Kanagawa (JP); Manabu Ohori, Kanagawa (JP); Keijiro Yamaguchi, Kanagawa (JP); Takashi Murai, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/657,470

(22) Filed: Sep. 7, 2000

(30) Foreign Application Priority Data

Sep. 7, 1999 (JP) .............................. 11-253613
Jun. 8, 2000 (JP) ........................ 2000-171780

(51) Int. Cl.$^7$ ................................ C22C 9/00
(52) U.S. Cl. ................. 148/432; 148/433; 148/434; 148/435; 148/436; 384/527; 384/913
(58) Field of Search ................. 148/432, 433, 148/434, 435, 436; 384/527, 913

(56) References Cited

U.S. PATENT DOCUMENTS 3,586,407 A   6/1971   Schweitzer
3,722,969 A   3/1973   Eklund

FOREIGN PATENT DOCUMENTS

| DE | 42 18 609 A1 | 12/1993 |
| EP | 63 246 507 | 10/1988 |
| GB | 795 242 A | 5/1958 |
| JP | 60174842 | 9/1985 |
| JP | 61133357 | * 6/1986 |

* cited by examiner

*Primary Examiner*—Sikyin Ip
(74) *Attorney, Agent, or Firm*—Sughrue Mion, PLLC

(57) ABSTRACT

A brass is a base material, and a material containing Mn and Si is cast to make a ring material. A metallic structure in the cross section of the ring material is under a condition where an intermetallic compound $Mn_5Si_3$ is uniformly and finely scattered and precipitated in the base material (brass composed of α- and β-phase). A machined retainer provided by matching said material has an excellent sizing precision, sound affect resistance.

7 Claims, 4 Drawing Sheets

25 μm

RETAINER

BACKGROUND OF THE INVENTION

The present invention relates to a machined retainer of rolling bearing.

A machined retainer of rolling bearing is a retainer made by machining/grinding forged products, bar materials or cast ones, and ordinarily it is formed with Cu alloys. In particular, high strength brass materials where brass is added with Al, Mn, Ni and Fe are of self-lubricity and suited as materials for retainers requiring abrasion resistance, seizure resistance and mechanical strength. As the high strength brass materials for machined retainers conventionally employed, the high strength brass cast-Category 1 (HBsC1) by JIS or the high strength brass cast-Category 2 (HBsC2) may be taken up.

On the other hand, as the using conditions of rolling bearings have recently been severe, retainers have also been demanded to possess high processing precision. Especially, if a column of the retainer is tilted, the column and the rolling body interfere each other and issue creaking, so that sound effect is deteriorated. Therefore, in recent times, a free-cutting brass which is higher in the machinability than the high strength brass has been used as the Cu alloy for the machined retainer.

The free-cutting brass (for example, Brass cast-Category 3: YBsC3) is a material where Pb is added to brass. In the free-cutting brass material, a high cutting property can be provided in that Pb grains scattered in a base material serve as a chip breaker reducing a cutting stress.

However, since the free-cutting brass is weak in a binding strength between the base material and the Pb grains, the Pb grain is easy to fall off during machining, and traces of this falling-off easily remain in the surface of the retainer after grinding. As a result, there is a risk that coarseness grows larger in the retainer surface and lowers the sound effect.

If the coarseness in the retainer surface is large, amounts of initial abrasion in a pocket face and a guiding face may be large. In such a case, dimensions of the retainer are changed during working, otherwise abrasion powders are mixed as foreigners in a lubricant, and delamination will start from the surface of a bearing ring or a rolling body.

Further, as the Pb grain is very soft, yield stress of the free-cutting brass is low, and plastic deformation easily occurs if excessive stress is loaded during cutting process. Therefore, if the machined retainer is formed with the free-cutting brass, the column of the retainer is plastic-deformed and the sound effect may be deteriorated.

In addition, Pb is a harmful substance to human living bodies and environments, and much Pb addition to brass for heightening the machinability is not desirable also in view of the protection of environment.

Besides, the retainer made with Cu alloy containing much Pb has a room to be improved in the abrasion resistance.

SUMMARY OF THE INVENTION

The invention has been established by paying attentions to problems involved with the prior art, and it is a subject matter of the invention to form the machined retainer with such a material having the high machinability, mechanical strength, sound effect and abrasion resistance, and having no problem in regards of safety and the protection of environment.

For solving the problems as mentioned above, it is an object of the invention to provide a machined retainer of rolling bearing made of a material wherein crystals of intermetallic compound are finely dispersed in a base material comprising a Cu alloy.

In the retainer according to the present invention, it is advantageous that the Cu alloy contains Pb 0.4 wt % or lower. In addition, in the retainer according to the present invention, it is preferable that the retainer is formed with the Cu alloy containing Pb 0.1 wt % or lower.

In the retainer according to the present invention, it is also advantageous that the retainer has a surface hardness of which is 110 or higher in Vickers hardness (HV).

Further, in the retainer according to the present invention, it is advantageous that the content percent of the intermetallic compound is 5 to 30% in an area ratio. In addition, it is preferable that the content percent of the intermetallic compound is 8 to 30% in the area ratio.

Furthermore, in the retainer according to the present invention, it is advantageous that at least one element forming the intermetallic compound is selected from the group consisting of Mn, Fe, Si, Co, Ti, Nb, V, Zr, Al and Ni.

Moreover, in the retainer according to the present invention, it is advantageous that the intermetallic compound comprises at least one of $Mn_5Si_3$, $Cu_8Zn_2Si$ and $Cu_4ZnSi$.

Note that in the retainer according to the present invention, the retainer may be made by a centrifugal casting method.

Further, in the retainer according to the present invention, it is advantageous that the Cu alloy is selected from at least one of brass, bronze, phosphorus bronze and aluminum bronze.

DETAILED DESCRIPTION OF THE PREFERRED EMBODIMENTS

Figure 1:
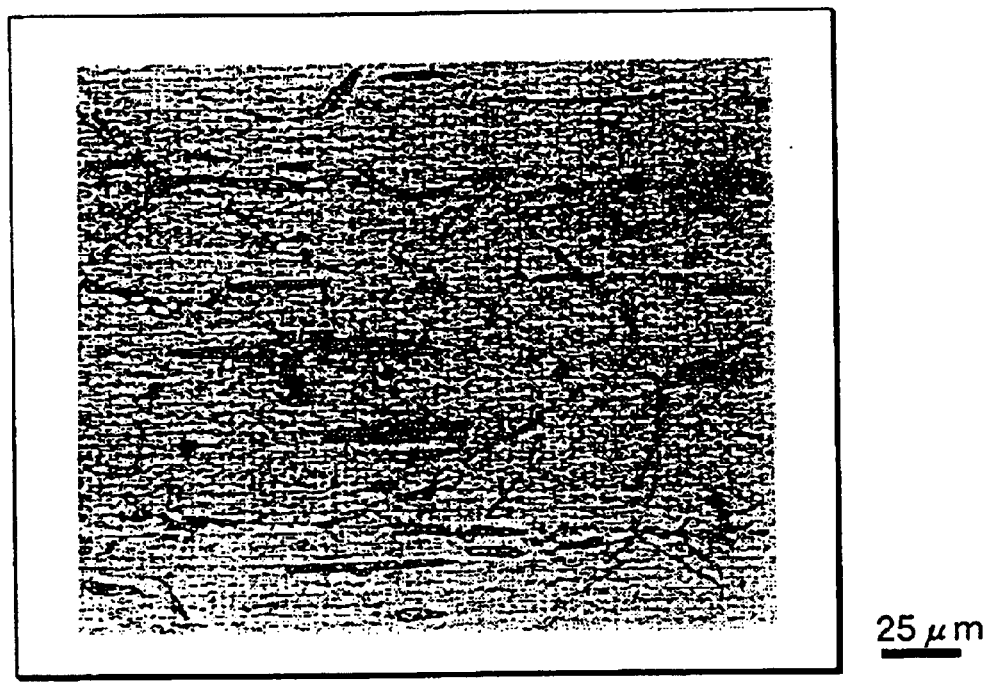
FIG. 1 is a photograph substituting for a drawing showing the metallic structure of the alloy used in the embodiment of the invention.

Reference will be made to the practicing mode of the invention.

A machined retainer of rolling bearing, according to one embodiment of the present invention, is formed with an alloy without containing Pb, in which crystals of intermetallic compound are finely dispersed in a base material comprising a brass.

The instant alloy can be produced by excluding lead (Pb) from such as YBsC3 and casting a material of a composition where any two or more from Si, Mn, Fe, Nb, Ti and Co are added. That is, by casting said material under the predetermined conditions, the intermetallic compound including the added components is crystallized during cooling after casting, and scattered into α phase and β phase of the base material.

This alloy has the high machinability, since the crystals of the intermetallic compound scattered in the base material serve as chip breakers reducing the cutting stress. Since the crystal is finely scattered, cut dusts when cutting become smaller, and at the same time the binding strength between grains of the crystal and the base material becomes high. As a result, Pb grains are difficult to fall off, and the fall-off traces are less to remain in the retainer surface after grinding. Accordingly the coarseness of the retainer surface is satisfactory Since the intermetallic compound (especially $Mn_5Si_3$) is very harder (around HV 700) than the α phase and β phase of the base material, and as the harder crystals are finely scattered in the base material, the grains of the intermetallic compound act as strengthening grains of the base material. The yield stress is high thereby in comparison with those of the free-cutting brass or the high strength brass, and if an excessive stress is loaded during machining, the plastic deformation is less to occur.

Thus, depending on this alloy, it is possible to obtain a desired strength with a smaller thickness than that of the existing machined retainer. Since the weight of the machined retainer can be thereby made lighter than that of the existing one, the machined retainer formed with this alloy can be served to usage at high speed rotation which has conventionally not been applicable.

Also depending on this alloy, the mechanical strength is high, so that the width of the column can be narrower than that of the existing machined retainer. Thus, it is possible to make a load capacity large by making the diameter of the rolling body large or by increasing the number of the rolling body.

In this alloy, the finely scattered intermetallic compound pins to hold the grain boundaries of the α phase and β phase of the base material during solidification, and the grain growth of the α phase and β phase is restrained and refined, so that a fatigue strength of this alloy is heightened. Therefore, the alloy is suited as a material forming the retainer repeatedly given stress.

The content percentage of the intermetallic compound in the alloy is preferably 5% or higher in the area ratio in an optional cross section of the metallic composition. Being less than 5%, the above mentioned working and effect by the intermetallic compound might substantially not be available. More preferable is 8% or higher. The more the content percentage of the intermetallic compound in the alloy, the larger the above mentioned working and effect by the intermetallic compound, however since the alloy is made brittle, 30% or lower is preferable.

As the embodiment of the machined retainer according to the invention, such a machine retainer will be taken up, that is, in a manner that brass is the base material and a material containing Mn and Si is cast, a member (for example, a ring material) is provided having a metallic structure under conditions where the intermetallic compound $Mn_5Si_3$ is dispersed uniformly and finely in the base material (brass composed of the α- and β-phases), and this member is machined so as to produce the machined retainer.

The machined retainer of the invention is preferably made by a centrifugal casting method. In this method, as a molten metal is effected with a centrifugal force, gas, slag or impurities of lower density than that of the molten metal are moved toward an inside (a side of a rotating axis) of the retainer as a product and the molten metal of high purity is gathered to an outside (a side of a product). As a result, products of less cast defects or impurities are obtained.

Further, as the centrifugal casting method is fast in a cooling rate in comparison with a continuously casting method, a solidified structure is easily refined. Consequently, products by the centrifugal casting method are higher in the mechanical strength than those by the continuously casting method. In addition, if the machined retainer is made depending on the centrifugal casting method, waste of materials is little and the productivity is increased.

In particular, if the centrifugal casting is carried out using a casting mold enabling to form a pocket hole of the retainer in correspondence to the shape of the retainer, a nearnet shape forming is possible, and products with a coarse pocket hole opening before a finish process are obtained. If the thus made cast product is employed, as the retainer is accomplished by the finish process only, a processing time can be largely saved in comparison with the case of opening the pocket hole in the ring through the machining process, resulting to enable reduction of the retainer-production cost.

The centrifugal casting method is suited to castings of alloys of high strength brass, bronze, phosphorus bronze or aluminum bronze other than the alloy used in the invention (alloy where crystals of the intermetallic compound are finely dispersed in the base material comprising brass).

The invention is to offer the machined retainer of rolling bearing characterized in that the retainer is formed with Cu alloy containing Pb 0.4 wt % or lower and the surface hardness is 110 or higher in the Vickers hardness (HV).

According to this retainer, the safeness is high for human living bodies or environment in comparison with conventional retainers made of Cu alloys, surface roughness is improved and abrasion resistance is high. In particular, in view of the safeness of the human living bodies or the environment, it is preferable to form the retainer with the Cu alloy of Pb being 0.1 wt % or less, and more preferable is to form the retainer with Cu alloy without Pb.

As a method of increasing the hardness of the Cu-made retainer, at first by casting a raw material for the retainer (a material prior to machining into a shape of the retainer) where elements as Mn, Fe, Al or Ni are added to Cu, these element are made solute in Cu as the base material. Secondly, there is a method of using, as the raw material for the retainer, a cast material where precipitated or crystallized materials of hard quality are dispersed in Cu being the base material. The second method is large in effect of increasing the hardness.

The second method carries out the casting of a raw material for retainer with a material where elements (Fe, Si, Co, Ti, Nb, V and Zr) are added to brass or high strength brass for forming the intermetallic compound by reacting with Cu, Zn or Mn. As the intermetallic compounds, there are $Mn_5Si_3$, $Cu_8Zn_2$, Si or $Cu_4ZnSi$. Other than them, many compounds exist whose compositions or crystal structures are not clear. These intermetallic compounds are very hard, and the hardness of the retainer can be heightened by employing, as a raw material, the cast product where the intermetallic compound is dispersed in the Cu alloy being the base material.

In contrast, a Cu-alloy of low Pb content has a low machinability, since Pb grain serving as the chip breaker is few. Therefore, if using the Cu alloy of Pb content being 0.4 wt % or lower as the material for the retainer, the machinability should be heightened by adding grains other than Pb acting as the chip breaker to the Cu alloy.

If a raw material for the retainer is cast with a material where one or more of Fe, Si, Co, Ti, Nb, V and Zr are added to brass or high strength brass, this raw material has a metallic structure where the intermetallic compound is grain or acicular and is scattered in the base material comprising brass. This intermetallic compound (in particular $Mn_5Si_3$) is very hard as mentioned, and acts as the chip breaker.

Besides, being thermally stable, the intermetallic compound is not melted by heating while machining. If using the cast product where the intermetallic compound is grain or acicular and is scattered in the base material comprising brass, the surface coarseness is made good, the amount of initial abrasion in the pocket face or the guiding face can be effectively reduced.

Therefore, if the raw material for the retainer is cast with a material where Pb is removed from brass or high strength brass and one or more of Fe, Si, Co, Ti, Nb, V and Zr are added to, it is possible to maintain high the machinability of the raw material for the retainer, and increase the hardness of the retainer. 4

1st EXAMPLE

With the alloys (the base material is brass) of the respective compositions shown in Table 1, the machined retainers for the cylindrical roller bearing of the bearing number NU218 were made (two-body division type).

Firstly, the ring materials comprising the alloys of the respective compositions in Table 1 of 140 mm outer diameter, 115 mm inner diameter and 32 mm width were obtained through the continuous casting. The casting condition was 1100° C. of the molten metal temperature.

Next, the respective ring materials were divided into rings A of 4 mm width and rings B of 28 mm width. The ring B was ground with a lath at the inner and outer peripheries and the edge to be a predetermined shape, and the peripheries were opened for pocket by the end milling. Then, the pocket was chamfered by the slotter, and was trimmed to remove burrs by the barrel polishing.

Also the ring A was ground with a lath at the inner and outer peripheries to be a predetermined shape. The rings A and B were combined to form riveting holes and subjected to the finish polishing by the buff, and finally the caulking was done on the rivet so as to set up the retainer.

Thus, the cylindrical retainers were produced of 135 mm outer diameter, 120 mm inner diameter, 25 mm width, 18 mm of size in the axial direction of the pocket, 7.5 mm of size in the radial direction of the same and 8 mm width of the column.

Each of the ring materials was cut at an optional plane, and the metallic structure of the cut plane was observed by the metallurgical microscope for measuring the area of the intermetallic compound, thereby to calculate the content percentage of the intermetallic compound in the alloy. The results are shown in Table 2.

Herein, FIG. 1 is a photograph showing the metallic structure of the cut plane of No. 5 ring material. The acicular crystals laterally extending in this photograph are the intermetallic compound $Mn_5Si_3$. In the ring materials of Nos. 1 to 7, the intermetallic compound containing $Mn_5Si_3$ or Si was uniformly and finely scattered and precipitated in the base material (brass composed of the α- and β-phases). Nos. 8 and 9 ring materials comprised only the base material, and the intermetallic compound did not exist. No. 8 alloy is HBsC1 and No. 9 alloy is YBsC3.

Figure 2:
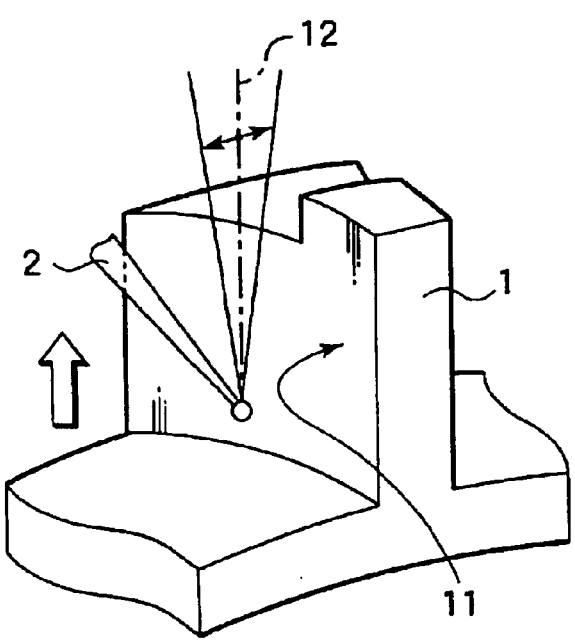
FIG. 2 is a view for explaining a measuring method of the inclining amount of the column.
Figure 3:
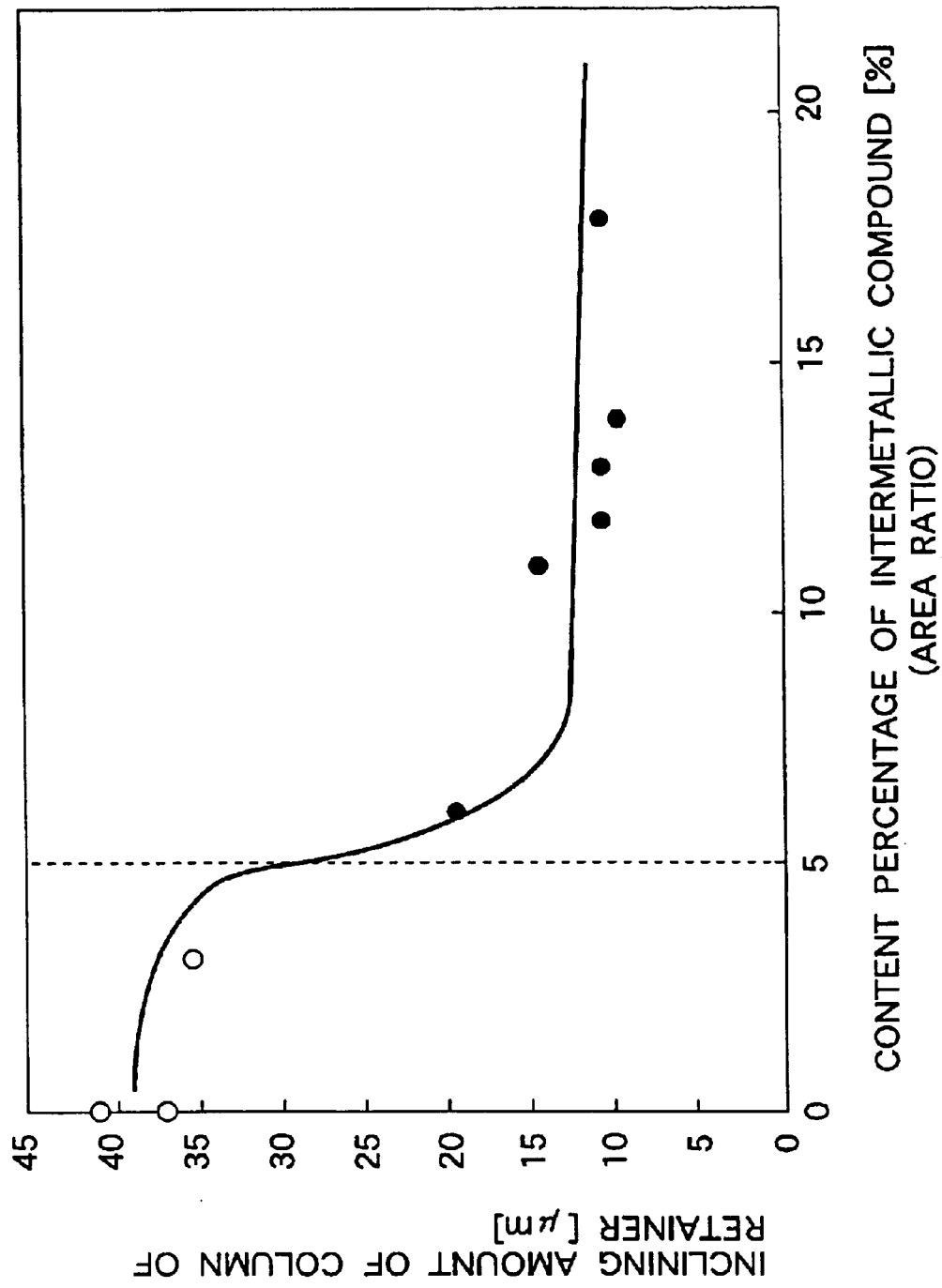
FIG. 3 is a graph showing the relation between the content percentage (area ratio) of the intermetallic compound and the inclining amount of the column of the retainer.

The inclining amount of the column of the obtained retainer was measured by the dial gauge. This measuring is, as shown in FIG. 2, carried out by contacting the probe 2 of the dial gauge to the face 11 which the roller of the column 1 contacts and moving the probe 2 in the length direction of the column 1. A maximum "offset" amount from the set face 12 of the face 11 in the length direction of the column is evaluated as "the inclining amount of the column". The results are shown in Table 2 and FIG. 3.

The cylindrical roller bearings of the bearing number NU218 were made by incorporating the respective retainers in the bearing. These bearings were subjected to the dropping impact tests. That is, shafts were passed through the respective bearings for furnishing the housings, and the shafts were suspended upward and the whole housings were repeatedly given the impacts of acceleration being 180G and vibration being 2 Hz. The impact giving frequency until the retainers were cracked or broken was measured. The results are shown in Table 2.

Each of the retainers was attached to the rotation testing apparatus for carrying out the rotation test under conditions of the radial load of 1470N, the rotation number of 1200 rpm

TABLE 1

| | Composition (wt %) of Alloy | | | | | | | |
|---|---|---|---|---|---|---|---|---|
| No. | Cu | Zn | Mn | Al | Fe | Sn | Pb | Si |
| 1 | 79.0 | 19.2 | 1.3 | — | — | — | — | 0.5 |
| 2 | 60.0 | 35.0 | 2.3 | 0.9 | 0 | 0 | — | 1.0 |
| 3 | 56.8 | 38.1 | 2.4 | 1.5 | 0.1 | — | — | 0.9 |
| 4 | 62.0 | 32.4 | 2.5 | 1.5 | — | — | — | 0.9 |
| 5 | 59.0 | 36.5 | 2.5 | — | — | — | — | 1.0 |
| 6 | 76.1 | 20.7 | — | — | 0.1 | — | — | 3.1 |
| 7 | 79.0 | 19.2 | 1.5 | — | — | — | ≦0.1 (not more than 0.1) | 0.3 |
| 8 | 59.3 | 36.6 | 2.3 | 0.7 | 0.7 | 0.2 | 0.2 | <0.01 |
| 9 | 58.1 | 40.1 | <0.01 (less than 0.01) | <0.01 (less than 0.01) | 0.1 | <0.01 (less than 0.01) | 1.7 | <0.01 (less than 0.01) | and the grease lubricant ("MULTI KNOCK DX No. 1" made by Nippon Oil Co., Ltd.), and level of the sound pressure after 3 hours from starting of rotation was measured by the sound pressure meter. The results are shown in Table 2.

TABLE 2

| No. | Contents (%) of intermetallic compound | Inclining amount (μm) of column | Average level of sound pressure (dB) | Repeating frequency of dropping impact test (×10$^5$) |
|---|---|---|---|---|
| 1 | 6  | 19 | 70.3 | 4.8 |
| 2 | 11 | 14 | 70.9 | 4.3 |
| 3 | 13 | 10 | 70.6 | 5.0 |
| 4 | 12 | 10 | 71.0 | 5.1 |
| 5 | 14 | 9  | 70.8 | 4.6 |
| 6 | 18 | 10 | 70.5 | 4.1 |
| 7 | 3  | 35 | 75.1 | 1.3 |
| 8 | 0  | 41 | 81.2 | 2.3 |
| 9 | 0  | 37 | 83.5 | 1.9 |

As seen from this Table, in Nos. 1 to 7, since the machined retainers are formed with brass alloys where the intermetallic compound $Mn_5Si_3$ is uniformly and finely scattered and precipitated, the inclining amounts of the columns of the retainers are small and the sound effect of the bearing is preferable in comparison with Nos. 8 and 9 where the machined retainers are formed with the brass alloys without scattering of the intermetallic compound.

However, No. 7 where the content percentage (area ratio) of the intermetallic compound is 3% in the brass alloy with which the machine retainer was formed, is low in the impact resistance in comparison with Nos. 1 to 6 of the intermetallic compound being 6 to 18% and Nos. 8 and 9 of 0%. Further as apparently from the graph of FIG. 3, if the content percentage of the intermetallic compound is 5% or higher in the area ratio, the inclining amount of the column is considerably smaller than the case of 5% or less. It is seen from the graph of FIG. 3 that if the content percentage of the intermetallic compound is 8% or higher in the area ratio, the inclining amount of the column is substantially constant at around 10 μm and that the reducing effect of the column fall amount is saturated.

From this fact, it is seen that the machined retainers formed with brass alloy where the content percentage of the intermetallic compound $Mn_5Si_3$ is 5% or higher (preferably 8% or higher), is excellent all over the sizing precision, the sound effect and the impact resistance.

2nd EXAMPLE

The machined retainer (one-body type) for the cylindrical roller bearing of the bearing number NU218 was made with No. 1 alloy of Table 1 through the centrifugal casting method using the casting mold corresponding to the shape of the retainer (having a part corresponding to the pocket).

Figure 4:
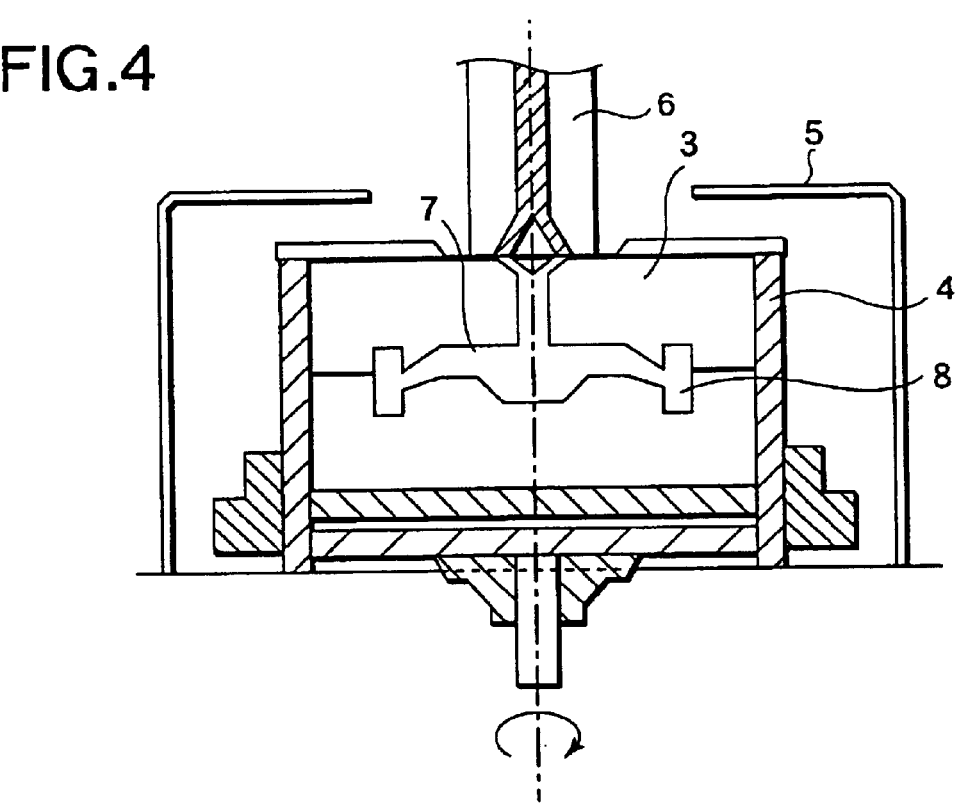
FIG. 4 is a view showing the centrifugal casting apparatus used in the embodiment of the invention.

The centrifugal casting was carried out with the apparatus as shown in FIG. 4. The apparatus is equipped with the rotating container 4 carrying the casting mold 3 therein and the cover 5 encircling the rotating container 4. The casting was performed as rotating the casting mold 3 by rotating the rotating container 4 and contacting the pouring nozzle 6 rotating in synchronism with the casting mold 3 to the inlet of the molten metal from the casting mold 3. The casting conditions were 850 rpm of the rotation speed and 1100° C. of the molten metal temperature.

The cast product was taken out from the casting mold 3 after casting, and the runner part 7 of the molten metal was removed from the retainer 8. Thereby, the coarse retainer before finishing was obtained under the condition that the pocket was opened. The coarse retainer was finish-ground/polished and trimmed by the barrel polishing to remove burrs.

The ring material (comprising No. 1 Alloy of Table 1) from the continuous casting of the 1st Example was machined for making the machined retainer (one-body type) of the cylindrical roller bearing of the bearing number NU218. That is, the ring material was lathed at the inner and outer peripheries and the edge to be a predetermined shape, and the peripheries were opened for pocket by the end milling. Then, the pocket was chamfered by the slotter, and was trimmed to remove burrs by the barrel polishing.

The thus obtained cylindrical retainers were incorporated to produce the cylindrical roller bearings of the bearing number NU218, respectively. Herein, the cylindrical retainer produced by the centrifugal casting method is defined to be No. 21, and the cylindrical retainer produced by the continuous casting is defined to be No. 22.

With respect to these bearings, the dropping impact tests were performed through the same method as the 1st Example, and the impact giving frequency until the retainers were cracked or broken was measured. The dropping impact tests were done under the condition that the radial load of 19.6 kN was given to the bearings. The same three bearings were prepared for testing, and the test results were evaluated with the average values.

The impact giving frequency until the retainers were cracked or broken was 98×10$^4$ times in the No. 21 and 81×10$^4$ times in No. 22.

The metallic structures of the retainers of Nos. 22 and 21, were observed by the metallurgical microscope, and when the grain diameter of the β-phase of the base material comprising the α- and β-phases was measured, it was 41 μm in No. 21 and 52 μm in No. 22. That the β-phase grain diameter of No. 21 is smaller than that of No.22 is resulted in that the solidified structure was refined since the centrifugal casting method is faster than the continuously casting method. It is assumed that the mechanical strength is heightened by the refining of the solidified structure and the impact resistance was also heightened.

3rd EXAMPLE

The Cu alloys shown in Table 3 are prepared.

TABLE 3

| | Composition (wt %) of Alloy | | | | | | | | |
| | Cu | Si | Pb | Sn | Fe | Mn | Ni | Al | Zn | JIS |
|---|---|---|---|---|---|---|---|---|---|---|
| A | 89.1 | — | 5.2 | 5.4 | — | — | — | — | — | C93634 |
| B | 83.1 | — | 7.3 | 6.6 | — | — | — | — | 2.9 | CDA93200 |

TABLE 3-continued

| | Composition (wt %) of Alloy | | | | | | | | | |
|---|---|---|---|---|---|---|---|---|---|---|
| | Cu | Si | Pb | Sn | Fe | Mn | Ni | Al | Zn | JIS |
| C | 59.0 | — | 1.6 | 0.1 | 0.1 | — | — | — | Balance | YBsC3 |
| D | 58.5 | — | 2.3 | 0.2 | 0.2 | — | — | — | Balance | C3771 |
| E | 59.8 | — | — | — | — | — | — | — | Balance | C2800 |
| F | 59.9 | — | 0.2 | 0.2 | 0.7 | 2.3 | 0.2 | 0.7 | Balance | HBsCl |
| G | 57.5 | — | 0.3 | 0.1 | 0.5 | 0.8 | — | 0.7 | Balance | C6782 |
| H | 76.0 | 2.9 | — | — | — | — | — | — | Balance | |
| I | 57.5 | 0.9 | 0.2 | — | — | 2.3 | — | 1.5 | Balance | |
| J | 59.9 | — | 0.2 | 0.2 | 0.7 | 2.2 | 0.2 | 0.7 | Balance | HBsCl |
| K | 58.1 | — | 0.4 | 0.2 | 0.7 | 2.4 | 0.2 | 0.6 | Balance | HBsCl |
| L | 57.5 | 0.9 | 0.1 | — | — | 2.3 | — | 1.5 | Balance | |
| M | 59.0 | 1.0 | 0.6 | — | — | 2.5 | — | — | Balance | |
| N | 59.0 | 1.0 | 0.3 | — | — | 2.5 | — | — | Balance | |
| O | 60.0 | — | 0.5 | 0.2 | 0.7 | 2.1 | 0.2 | 0.7 | Balance | |
| P | 58.5 | — | 1.2 | 0.2 | 0.7 | 2.3 | 0.2 | 0.7 | Balance | |

The test pieces for measuring the Vickers hardness and the Saban type abrasion testing machine were produced with the Cu alloys A to I.

With respect to the Vickers hardness, the micro Vickers testing machine was used for measuring 5 points under the condition of the load of 29.4N, and the average values were calculated.

Figure 5:
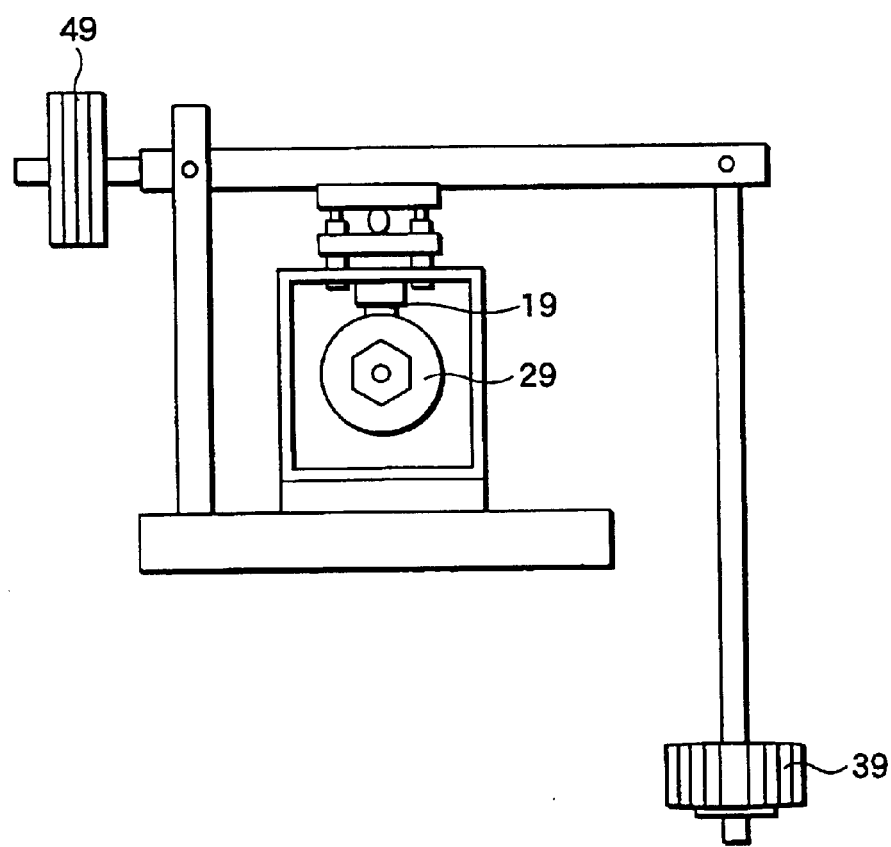
FIG. 5 is a view showing the Saban type abrasion testing machine used in the embodiment of the invention.

The abrasion tests were made by using the Saban type abrasion testing machine as shown in FIG. 5. At first, the stationary testing piece 19 and the rotation testing piece 29 were made, and attached to the testing machine. While the stationary testing piece 19 was being pressed to the outer periphery by the loading weight 39 and the balancing weight 49, the rotation testing piece 29 was rotated with respect to the stationary testing piece 19.

Figure 6:
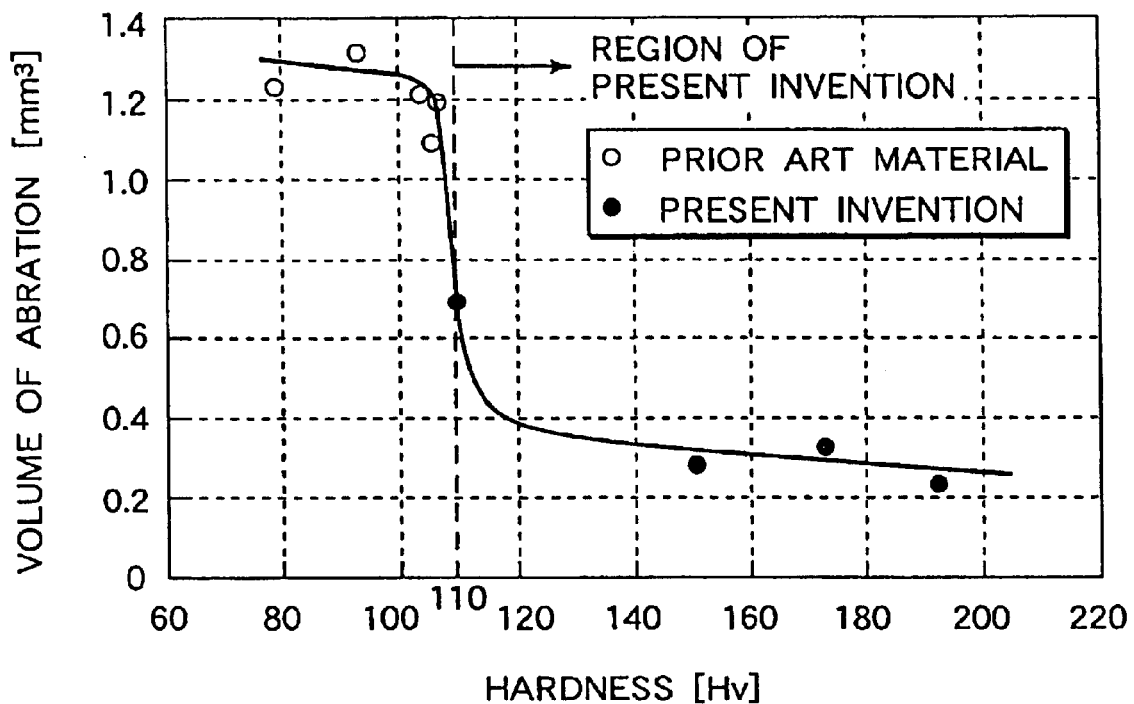
FIG. 6 is a graph showing the relation between the hardness and the abrasion resistance (volume of abrasion) of the Cu alloy.

The pressing load was 39.2N and the rotation speed (peripheral speed) was 2.6 m/s, and the rotation was continued for a time corresponding to the distance of 400 m. The total value of volumes of both testing pieces reduced by the rotation was measured as the abrasion volume (mm³). The results are shown in Table 4. The relation between the hardness and the abrasion resistance (abrasion volume) of the Cu alloy is graphed in FIG. 6.

TABLE 4

| No. | Alloys | Pb contents (wt %) | Hardness (Hv) | Volume (mm³) of abrasion |
|---|---|---|---|---|
| 11 | A | 5.2 | 79 | 1.23 |
| 12 | B | 7.3 | 92 | 1.31 |
| 13 | C | 1.6 | 103 | 1.21 |
| 14 | D | 2.3 | 106 | 1.19 |
| 15 | E | — | 105 | 1.09 |
| 16 | F | 0.2 | 110 | 0.69 |
| 17 | G | 0.3 | 152 | 0.29 |
| 18 | H | — | 171 | 0.33 |
| 19 | I | 0.2 | 190 | 0.24 |

As is seen from these results, the satisfied abrasion corrosion can be provided by specifying the hardness of the Cu alloy being HV 110 or higher. If specifying the hardness of the Cu alloy being HV 150 or higher, a more satisfied abrasion resistance could be provided.

Figure 7:
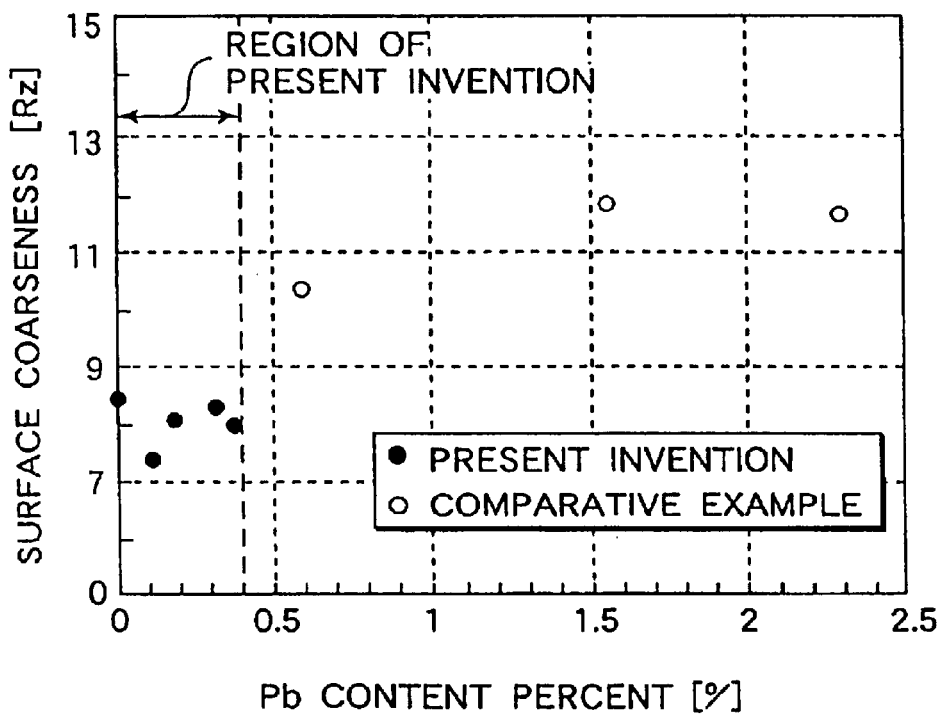
FIG. 7 is a graph showing the relation between the Pb content percent and the surface coarceness of the Cu alloy.

Among the Cu alloys of Table 3, those shown with signs of Table 5 were used to make test pieces for investigating the surface coarseness of the machined faces. The test piece was shaped in a column of 200 mm length and 40 mm diameter. Each of the test pieces was machined under the conditions of the cutting speed being 100 m/min and the feed speed of the cutting edge being 0.11 mm/rotation, and the surface coarseness (Rz) of the machined face was measured. The results are shown in Table 5. The relation between the Pb content percent and the surface coarseness of the Cu alloys obtained from these results is graphed in FIG. 7.

TABLE 5

| No. | Alloys | Pb contents (wt %) | Coarseness (Rz) of surface |
|---|---|---|---|
| 21 | J | 0.2 | 7.9 |
| 22 | G | 0.3 | 8.1 |
| 23 | K | 0.4 | 7.8 |
| 24 | C | 1.6 | 11.7 |
| 25 | D | 2.3 | 11.5 |
| 26 | H | — | 8.3 |
| 27 | L | 0.1 | 7.2 |
| 28 | M | 0.6 | 10.2 |

As is seen from these results, the satisfied surface coarseness can be provided by specifying the Pb content percent 0.4 wt % or lower. The test pieces Nos. 21 to 23, 26 and 27 are the Cu alloys of Pb being 0.4 wt % or lower, but these Cu alloys are brasses containing Cu and Zn and containing any one or more elements of Si, Sn, Fe, Mn, Ni and Al. If Pb is low in the Cu alloy, the machinability is reduced, but since these elements are added, the machinability of Nos. 21 to 23, 26 and 27 is good.

Of the Cu alloys of Table 3, A to I and N to P were employed producing the ring materials by the continuous casting, and the ring materials were machined to produce the machined retainers (one-body) for cylindrical roller bearings of the bearing number NU218.

Each of the obtained retainers was incorporated to make the cylindrical roller bearing of the bearing number NU218. With respect to these bearings, the dropping impact tests were performed through the same method as the 1st Example, and the impact giving frequency until the retainers were cracked or broken was measured. The results are shown in Table 6.

Of the Cu alloys of Table 3, A to I and N to P were employed for producing ring materials by the continuous casting, and the ring materials were machined to produce the machined retainers (one-body) for cylindrical roller bearing of the bearing number 22220.

Each of the obtained retainers was incorporated to make the self-aligning roller bearing of the bearing number 22220.

With respect to these bearings, while the lubrication was being carried out by the forced circulation method of supplying an oil at 40° C. at rate of 1 liter/min, the rotation test was performed for 100 hours under the conditions of the load 14.6 kN and the rotation speed 5000 rpm. The retainers were measured in weight before and after the rotation test, and the reducing amount (mg) of the weight of the retainer was investigated as the abrasion amount. The results are shown in Table 6.

TABLE 6

| No. | Alloys | Pb contents (wt %) | Hardness (Hv) | Repeating frequency of dropping impact test (×10$^5$) | Abrasion amount (mg) of abrasion test |
|---|---|---|---|---|---|
| 31 | A | 5.2 | 79  | 0.5 | 2.11 |
| 32 | B | 7.3 | 92  | 0.6 | 1.92 |
| 33 | C | 1.6 | 103 | 0.7 | 1.54 |
| 34 | D | 2.3 | 106 | 0.9 | 1.39 |
| 35 | E | —   | 105 | 4.0 | 0.83 |
| 36 | F | 0.2 | 110 | 4.5 | 0.71 |
| 37 | G | 0.3 | 152 | 5.8 | 0.61 |
| 38 | H | —   | 171 | 9.1 | 0.29 |
| 39 | I | 0.2 | 190 | 9.2 | 0.32 |
| 40 | N | 0.3 | 157 | 5.7 | 0.55 |
| 41 | O | 0.5 | 131 | 4.7 | 1.22 |
| 42 | P | 1.2 | 115 | 4.9 | 1.35 |

As is seen from these results, in Nos. 35 to 40 corresponding to the Examples of the invention, the excellent performances are available in both of the impact resistance and the abrasion resistance. In contrast, in Nos. 31 to 34, 41 and 42 corresponding to the Comparative examples, the performances are insufficient in both of he impact resistance and the abrasion resistance.

Among Nos. 35 to 40, in Nos. 38 and 39, the especially excellent performances are obtained, and Nos. 37 and 40 are next to them. No. 38 is the brass alloy-made retainer not containing Pb at all but added with Si. Nos. 39 and 40 are the brass alloy- made retainers containing Pb 0.4 wt % or lower and added with Si and Mn.

It is considered that the retainers of Nos. 38, 39 and 40 have the hard surface and the excellent impact resistance and abrasion resistance in that crystals of the intermetallic compound comprising $Mn_5Si_3$, $Cu_8Zb_2Si$ and $Cu_4ZnSi$.

The above stated modes for carrying out the invention refer to the machined retainers for the cylindrical roller bearings and the self-aligning roller bearings, but the invention is not limited thereto, but applicable to any of a deep groove ball bearing, an angular bearing or an acicular roller bearing.

As mentioned above, according to the invention, it is possible to offer such machined retainers having no problems in view of safety of materials or the protection of environment, but the excellent sizing precision, sound effect, abrasion resistance and impact resistance.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A machined retainer, of a rolling bearing, made of a material wherein crystals of intermetallic compound are dispersed in a base material comprising a Cu alloy, wherein the Cu alloy contains Pb in an amount in the range of from greater than 0 wt % to 0.4 wt % or lowers, wherein the surface hardness is Hv 110 or higher but does not exceed 171, whereby the retainer is impact resistant, and wherein the retainer further comprises a pocket.

2. The retainer as set forth in claim 1, wherein the content percent of the intermetallic compound is 5 to 30% in an area ratio.

3. The retainer as set forth in claim 1, wherein at least one element forming the intermetallic compound is selected from the group consisting of Mn, Fe, Si, Co, Ti, Nb, V, Zr, Al and Ni.

4. The retainer as set forth in claim 1, wherein the intermetallic compound comprises at least one of $Mn_5Si_3$, $Cu_8Zn_2Si$ and $Cu_4ZnSi$.

5. The retainer as set forth in claim 1, wherein said retainer is made by a centrifugal casting method.

6. The retainer as set forth in claim 1, wherein said retainer is formed with the Cu alloy containing Pb in the range of from greater than 0 wt % to 0.1 wt % or lower.

7. The retainer as set forth in claim 1, wherein the Cu alloy is selected from at least one of brass, bronze, phosphorus bronze and aluminum bronze.

* * * * *